(12) United States Patent
Griffin et al.

(10) Patent No.: US 11,469,460 B1
(45) Date of Patent: Oct. 11, 2022

(54) SUBSURFACE ELECTRICAL STORAGE BATTERIES

(71) Applicant: Hunt Energy Enterprises, L.L.C., Dallas, TX (US)

(72) Inventors: Mark Griffin, Dallas, TX (US); Fantai Kong, McKinney, TX (US)

(73) Assignee: HUNT ENERGY ENTERPRISES, L.L.C., Dallas, TX (US)

( * ) Notice: Subject to any disclaimer, the term of this patent is extended or adjusted under 35 U.S.C. 154(b) by 62 days.

(21) Appl. No.: 16/246,301

(22) Filed: Jan. 11, 2019

Related U.S. Application Data

(60) Provisional application No. 62/616,343, filed on Jan. 11, 2018.

(51) Int. Cl.
| | |
|---|---|
| *H01M 50/10* | (2021.01) |
| *H01M 4/58* | (2010.01) |
| *H01M 4/583* | (2010.01) |
| *H01M 8/18* | (2006.01) |
| *H01G 11/04* | (2013.01) |
| *H01G 11/46* | (2013.01) |
| *H01G 11/58* | (2013.01) |
| *H01G 11/84* | (2013.01) |
| *H01G 11/32* | (2013.01) |
| *H01M 50/60* | (2021.01) |
| *H01M 4/86* | (2006.01) |

(52) U.S. Cl.
CPC ............ *H01M 50/10* (2021.01); *H01G 11/04* (2013.01); *H01G 11/32* (2013.01); *H01G 11/46* (2013.01); *H01G 11/58* (2013.01); *H01G 11/84* (2013.01); *H01M 4/583* (2013.01); *H01M 4/5825* (2013.01); *H01M 8/18* (2013.01); *H01M 50/60* (2021.01); *H01M 2004/8684* (2013.01); *H01M 2004/8689* (2013.01); *H01M 2300/0011* (2013.01)

(58) Field of Classification Search
CPC ...... H01M 2/024; H01M 2/362; H01M 50/60; H01G 11/04; H01G 11/32
See application file for complete search history.

(56) References Cited

U.S. PATENT DOCUMENTS

| | | | | |
|---|---|---|---|---|
| 155,209 | A * | 9/1874 | Snow ................... | H01M 14/00 429/47 |
| 329,724 | A * | 11/1885 | Dieckmann ........... | H01M 14/00 429/47 |
| 495,582 | A * | 4/1893 | Emme ................... | H01M 14/00 429/47 |
| 728,381 | A * | 5/1903 | Emme ................... | H01M 14/00 429/47 |
| 3,026,938 | A * | 3/1962 | Huitt ..................... | C09K 8/805 166/280.1 |
| 3,114,875 | A * | 12/1963 | Haagensen ............. | G01V 3/30 324/338 |
| 3,288,648 | A * | 11/1966 | Jones .................... | H01M 8/00 429/442 |
| 3,727,688 | A * | 4/1973 | Clampitt ................ | B01J 19/06 166/283 |

(Continued)

*Primary Examiner* — Sadie White
(74) *Attorney, Agent, or Firm* — Baker Botts L.L.P.

(57) ABSTRACT

A subsurface battery comprises an anodic fracture disposed within a subsurface stratum and a cathodic fracture disposed with the subsurface stratum. A first well electrode contacts the anodic fracture and a second well electrode contacts the cathodic fracture.

1 Claim, 7 Drawing Sheets

(56) References Cited

U.S. PATENT DOCUMENTS

| | | | | |
|---|---|---|---|---|
| 3,957,601 | A * | 5/1976 | Drinkard, Jr. | C25C 1/00 205/575 |
| 4,457,988 | A * | 7/1984 | Ryeczek | C25C 1/00 175/64 |
| 6,548,211 | B1 * | 4/2003 | Kamada | H01M 4/625 429/225 |
| 8,357,461 | B1 * | 1/2013 | Jackson | H01M 6/5022 429/47 |
| 2003/0196800 | A1 * | 10/2003 | Nguyen | C09K 8/805 166/254.1 |
| 2013/0189592 | A1 * | 7/2013 | Roumi | H01M 8/20 429/406 |
| 2017/0207489 | A1 * | 7/2017 | Zhamu | H01M 4/808 |

\* cited by examiner

SUBSURFACE ELECTRICAL STORAGE BATTERIES

CROSS-REFERENCE TO RELATED APPLICATION

The present application claims priority to U.S. Provisional Application Ser. No. 62/616,343 filed on Jan. 11, 2018.

TECHNICAL FIELD OF THE INVENTION

This invention relates to energy storage devices, aqueous electrochemical cells and batteries, capacitors and supercapacitors, hybrid batteries and supercapatteries, flow batteries and underground storage in general.

BACKGROUND OF THE INVENTION

Renewable energy sources such as wind and solar are becoming much more prevalent in the supply of electrical power to transmission grids. Their variable nature has created electrical transmission grid management problems and crippling downward pricing pressure on renewable power generators. Large scale storage is a potential solution to these problems, but the scale and attendant costs are enormous. As an example, in a single hour, one wind turbine can fully charge ten of the largest capacity electric automobile battery piles available today. These piles represent over ten tons of highly engineered and expensive materials for merely one hour of electric service.

SUMMARY OF THE INVENTION

There are many proposed options for grid scale energy storage; however, intensive cost for materials and engineering have so far prevented widespread application of any of these proposed storage solutions. Making use of naturally occurring materials already in place at enormous scale in the subsurface, and engineering which has for the most part already been developed within the oil and gas industry, there is promise of much lower cost for grid scale electrical storage. Renewable wind and solar energy devices cannot on their own provide dependable day in and day out service without practical and cost-effective companion electrical storage.

The present invention provides a method for the construction of electrical storage batteries within suitable geological strata utilizing strata modeling, drilling and fracturing technology common to the oil and gas industry. The invention takes advantage of the permeable salt water strata that are pervasive within geographically wide-spread geological formations that are familiar to petroleum geologists. In the simplest embodiment, drilled well pairs into the permeable salt water strata serve as electrodes. One of each pair may be fracture treated with materials suited to serving as a cathode in the battery, the other may be fracture treated with materials selected to serve as an anode. The indigenous salt water within the subsurface stratum may serve as an electrolyte; or if desired, the electrolyte may be modified by pumping fluid mixtures from one well to the other, displacing the original salt water.

To form a subsurface battery, oil well casings or their equivalents, which may be specifically modified to improve electrical transmission capabilities, are utilized as electrodes. Drilling practices developed to protect surface and freshwater resources are utilized, and production casings, the electrodes, are cemented in place after insertion into salt water saturated strata in the subsurface. Such strata are well known to geologists, and in one embodiment of a subsurface battery, may be abandoned oil fields which have "watered out" due to the encroachment of salt water into the wells as oil was displaced from the strata. In this case, any remaining wells might be re-purposed as electrodes.

After a pair of conductive casings are installed, they are completed as cathode and anode by fracture treating. One of each pair may be fracture treated with a slurry of materials suited to serving as a cathode in the battery, the other may fracture treated with materials selected to serve as an anode. As is well understood in the petroleum industry, orientation of stresses in the subsurface is an important consideration in fracture treating the casings.

Hydraulically induced fractures propagate in the plane perpendicular to the direction of least principle stress within subsurface strata, and due to depositional and tectonic forces that are common over very large areas, the fractures tend to be parallel in one common plane for most strata. In strata at depths less than 1000 feet, where the weight of overburden is relatively low and attendant vertical stress is low, induced fractures are likely to be horizontal, and pancake-like when unbounded in area. At deeper depths, fractures are generally vertical and oriented in the plane of greatest stress. To form a subsurface battery, well electrodes must be placed so that when they are completed by fracking with anodic and cathodic materials, the fractures present themselves to each other as large plates. Simultaneous fracture treatment of the anode-cathode well pairs may help mitigate the risk of fracturing into the plane of a companion well when the two are placed very closely together.

Knowledge of subsurface stress and ascertaining the preferential orientation of fractures in subsurface strata may be helpful. Orienting cathode and anode wells so that fractures extend from one well to another of the same type creates the opportunity for anode and cathode plates which may extend for kilometers.

Multiple pairs of electrode wells connected by fractures in the above fashion may lend themselves to flow batteries. In this embodiment of a subsurface battery, the fractures created may be of the traditional sand propped type designed to create a preferential conduit for flow of anolyte and catholyte. The less permeable matrix of the target stratum between the cathode wells and anode wells serves as an ion transport membrane.

Sodium based battery chemistry may be desirable for a subsurface battery, as sodium salt is the most common dissolved compound indigenous to the subsurface. Subsurface batteries are not limited to a particular chemistry, however. Flushing the porous strata between well pairs by pumping fluids into one well and out the other at matrix rates (below fracturing rates and pressures) will allow modification of the electrolyte.

For example, to create a lead acid battery, a sandstone stratum with a matrix inert to sulfuric acid may be selected. Use of acids of various sorts is a common procedure for treating wells in the petroleum industry and their effects on strata of various composition are well known. To make the battery, a well electrode pair may be drilled and installed, then the wells may be fracture treated with lead compounds. Finally, an appropriate aqueous solution of sulfuric acid may be pumped down one well, then out the other, displacing the porous matrix of the sandstone stratum between the wells.

Ultimately, it will be less expensive to construct underground batteries at shallower depths, but selection of the site for the battery construction will need to take into consideration both the location of the generated power and the location of suitable saltwater strata.

BRIEF DESCRIPTION OF THE DRAWINGS

FIG. 8 illustrates the charging process and principles for aqueous NaCl solution based dual ion battery if there is no Na and Cl source in electrodes.

DETAILED DESCRIPTION OF THE INVENTION

Figure 1:
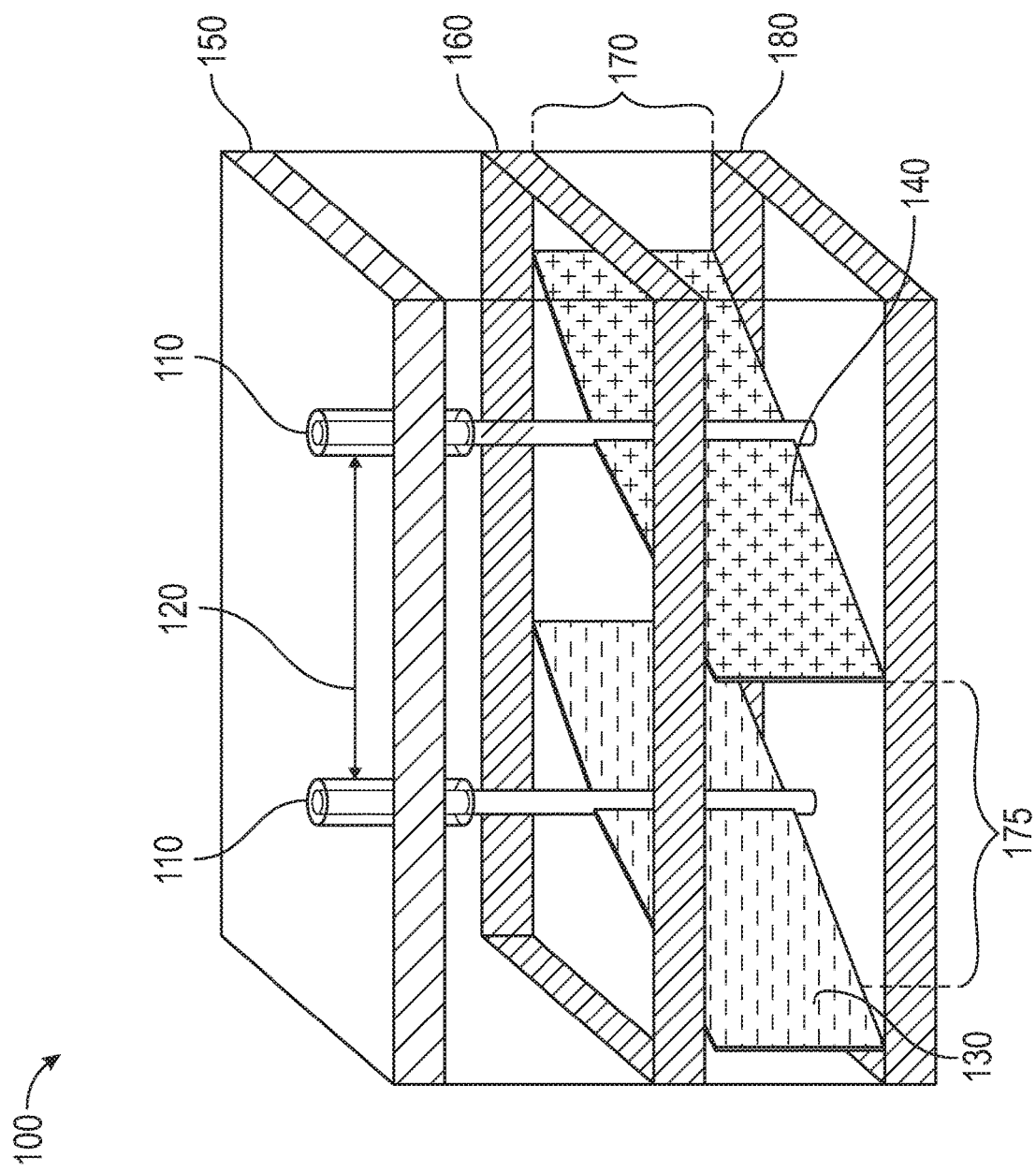
FIG. 1 is a diagram of a single pair of well electrodes with vertical parallel fracture plates, according to certain embodiments.

FIG. 1 is an illustration of a subsurface battery 100 with a single pair of well electrodes 110 with vertical parallel fracture plates, according to certain embodiments. The well casings may be cemented in from the base of the upper confining impermeable stratum, labeled as the impermeable upper boundary formation 160, to the base of the surface casings 120. Applying such surface protection casings may encapsulate the battery and protect the casing electrodes 110 from undesirable corrosion in strata above the battery zone. Additionally, such surface protection casing may also protect any surface and fresh water formations 150.

Each well casing 110 may penetrate a permeable salt water bearing formation 170. The permeable saltwater bearing formation 170 may be bounded by the impermeable upper boundary formation 160 above the permeable saltwater bearing formation 170 and an impermeable lower boundary formation 180 below the saltwater bearing formation 170. In particular embodiments, the permeable saltwater bearing formation 170 may be a depleted, abandoned, or otherwise "watered out" oil fields due to the encroachment of salt water into the wells as oil was displaced from the strata. In such an embodiment, remaining wells might be re-purposed as electrodes.

After the pair of conductive well casing electrodes 110 are installed, they are completed as cathode and anode by fracture treating the subsurface strata. One well casing electrode of the pair may be fracture treated with a slurry of materials suited to serving as a cathode in the battery, the other well casing electrode may be fracture treated with materials selected to serve as an anode. In some embodiments, the indigenous saltwater within the permeable saltwater bearing formation may serve as an electrolyte between the anode fracture and the cathode fracture. For example, sodium-based battery chemistry may be desirable for a subsurface battery, as sodium salt is the most common dissolved compound indigenous to the subsurface. A subsurface battery is not limited to a particular chemistry, however. The subsurface electrolytes may be modified by flushing the porous strata between well pairs 175 by pumping fluids into one well and out the other at matrix rates (flow rates below fracturing rates and pressures). In some embodiments electrolyte fluids may be pumped between the pairs to displace the original saltwater and replace it with a desired electrolyte fluid in the subsurface strata.

For example, one method of creating subsurface batter 100 may include drilling a first well into a subsurface stratum and drilling a second well into a subsurface stratum. Next, the permeable salt water bearing formation 170 of the subsurface stratum may be hydraulically fractured from the first well to form a first fracture and the permeable salt water bearing formation 170 of the subsurface stratum may be hydraulically fractured from the second well to form a second fracture. Next, the first fracture with an anodic material for form anodic fracture 130 and the second fracture may be treated with a cathodic material to form cathodic fracture 140. In some embodiments, additional wells may be drilled or used to form additional fracture plates as described with respect to FIG. 3.

In some embodiments, a subsurface battery may be constructed with a sodium iron phosphate treated cathodic fracture 140, and an anodic fracture 130 treated with a carbon-based material. Sodium iron phosphate particles may be used as fracturing media to create cathodic fracture 140. In certain embodiments, sodium iron phosphate particles may be suspended in any gels or other compounds knowing in the hydraulic fracturing industry to form a fracturing slurry for cathodic anode 140. Carbon-based materials used to treat anodic fracture 130 may include asphalts, petroleum coke (petcoke), or other petroleum industry byproducts. In some embodiments petcoke or asphalt grinds may be used as the fracturing media in a fracturing slurry used to fracture anodic fracture 130. In such embodiments, sodium chloride present in the permeable saltwater bearing formation 170 may serve as the electrolyte of the battery. In other embodiments, other battery chemistries may be used, including but not limited to, lithium iron phosphate, potassium ion, metal-halide, metal-sulfur, supercapacitor, supercapattery, hybrid battery and metal-acid.

In another embodiment, to create a lead acid subsurface battery 100, a sandstone stratum with a matrix inert to sulfuric acid may be selected for permeable saltwater bearing formation 170. Use of acids of various sorts is a common procedure for treating wells in the petroleum industry and their effects on strata of various composition are well known. To make the lead acid battery, a well electrode pair 110 may be drilled and installed, then the wells may be fracture treated with lead compounds. For example, lead shot could be used as a fracturing media in a fracturing slurry used to fracture cathodic fracture 140 and anodic fracture 130. Finally, an appropriate aqueous solution of sulfuric acid may be pumped down one well, at a pressure below the fracturing pressure of the permeable saltwater bearing formation 170, then out the other, displacing the porous matrix of the sandstone stratum 175 between the wells. In other embodiments, various other metal-acid subsurface batteries may be created by a similar method.

Anodic fracture 130 and cathodic fracture 140 may be formed by hydraulically fracturing the permeable saltwater bearing formation 170. Hydraulically induced fractures may propagate in the plane perpendicular to the direction of least principle stress within subsurface strata, and due to depositional and tectonic forces that are common over very large areas, the fractures tend to be parallel in one common plane for most strata. In particular embodiments, simultaneous fracture treatment of the anode-cathode well pairs may help mitigate the risk of fracturing into the plane of a companion well when the two are placed very closely together. In some embodiments, after anodic fracture 130 and cathodic fracture have been formed, saltwater bearing formation 170 may be treated to increase or decrease the concentration of electrolyte between anodic fracture 130 and cathodic fracture 140. For example, additional electrolytes, such as one or more of sodium chloride, potassium chloride, sulfuric acid, or other acids may be introduced through one or more of wells 110 to increase the electrolyte concentration, and fresh water may be introduced to decrease the electrolyte concentration.

In some embodiments, the anodic fracture 130 and cathodic fracture 140 may be formed vertically in the permeable salt water bearing formation 170 such that the vertical anodic fracture 130 and cathodic fracture 140 are parallel to each other. In some embodiments, the anodic fracture 130 and cathodic fracture 140 may be substantially parallel such that the do not intersect each other, or come within a minimum distance of each other, along the length of the fractures. Generally, fractures at depths greater than 1000 feet below the surface may be oriented in the vertical direction along the plane of greatest stress. Any number of cathodic and anodic fractures may be created to create multiple subsurface batteries or to increase the capacity of a single subsurface battery.

In some embodiments, anodic fracture 130 and cathodic fracture 140 may be separated by less than 50 meters of saltwater bearing formation 170. In particular embodiments, anodic fracture 130 and cathodic fracture 140 may be separated by less than 20 meters of saltwater bearing formation 170. In yet other embodiments, anodic fracture 130 and cathodic fracture 140 may be separated by approximately 10 meters of saltwater bearing formation 170.

In some embodiments, the less permeable, when comparted to the fractured anodic and cathodic fractures, matrix of the target stratum between the cathode wells and anode wells serves as an ion transport membrane. For example, porous strata between well pairs 175 of the permeable saltwater bearing formation 170 of FIG. 1 may serve as an ion transport membrane between the anodic fracture 130 and the cathodic fracture.

A subsurface battery may operate in a manner similar to a conventional battery but have the advantage of storing much greater amounts of energy. For example, after construction of the subsurface 100, a current may be applied to the well electrode 110 penetrating cathodic fracture 140 to charge the battery. When the battery has been charged, it may be connected to a load through well electrodes 110 to provide electricity for that load. In some embodiments loads could include a commercial power grid, industrial machinery, transformers, or any other device or apparatus requiring electrical power. In some embodiments, the voltage potential between well electrode 110 penetrating anodic fracture 130 and the well electrode 110 penetrating cathodic fracture 140 may be less than 2 volts. In particular embodiments, the voltage potential between well electrode 110 penetrating anodic fracture 130 and the well electrode 110 penetrating cathodic fracture 140 may be less than 1.5 volts. In particular embodiments, the voltage potential between the well electrode 110 penetrating anodic fracture 130 and the well electrode 110 penetrating cathodic fracture 140 may be approximately 1.4 volts. The current, however, produced by a subsurface battery 100 may be large, and in some embodiments may be in excess of 1000 Amperes.

Figure 2:
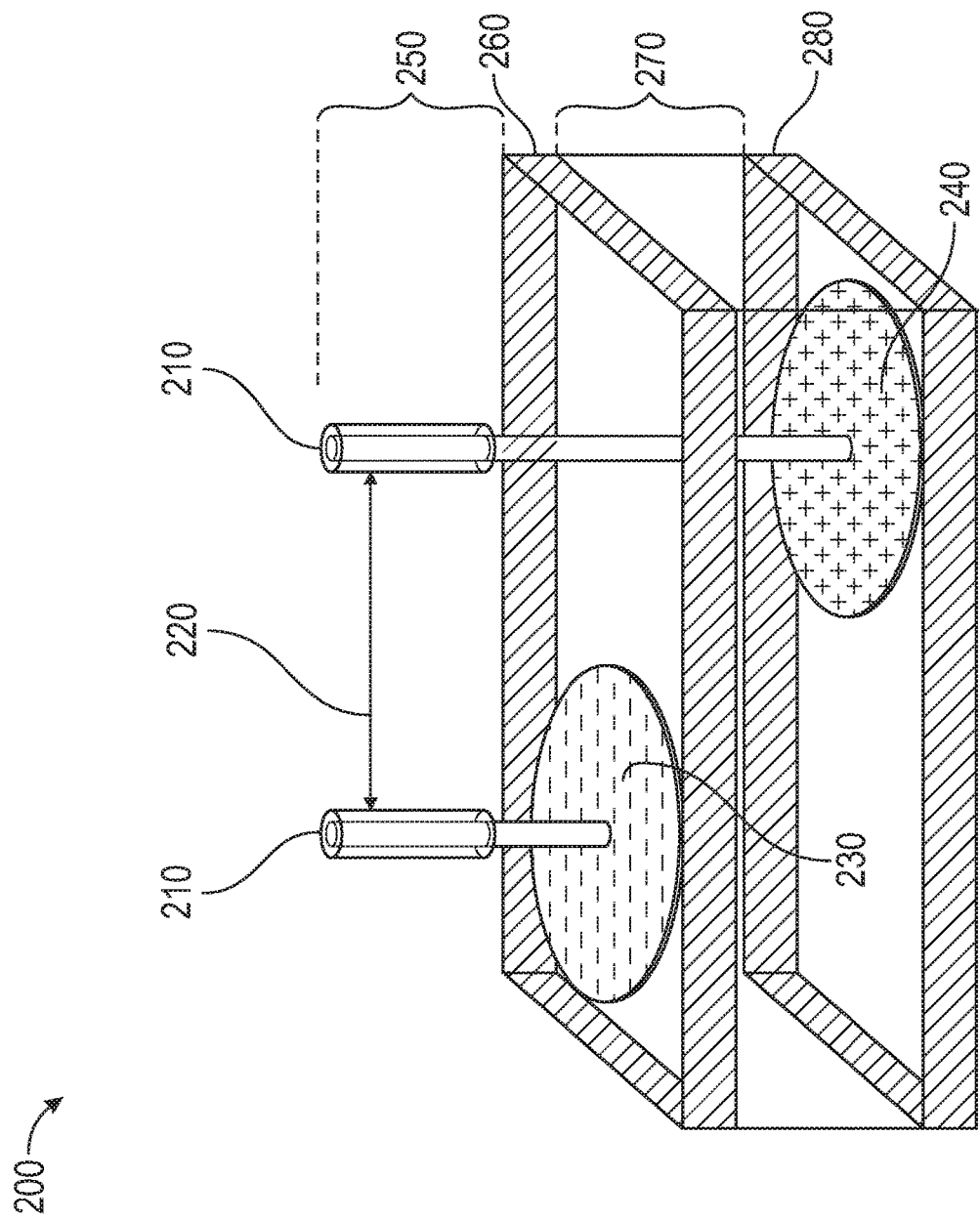
FIG. 2 is a diagram of a pair of electrodes with horizontal fractures at shallower depths, according to certain embodiments.

FIG. 2 is an illustration of a subsurface battery 200 with a pair of well electrodes 210 with horizontal fracture plates, according to certain embodiments. As with the subsurface battery illustrated in FIG. 1, the well casings 210 may be cemented in from the base of the impermeable upper boundary formation to the base of the surface casing 220 to encapsulate the battery and protect the casing electrodes 210 from undesirable corrosion in strata 250 above the battery zone. Additionally, as with the subsurface battery illustrated in FIG. 1, one well casing electrode 210 may penetrate an anodic fracture 230, and the other well casing electrode 210 may penetrate a cathodic fracture 240. In the illustrated embodiment, the anodic fracture 230 and cathodic fracture 240 are formed horizontally within the permeable saltwater bearing formation 270. Horizontal fractures may be formed in the permeable saltwater bearing formation 270 at depths less than 1000 feet. At such depths, the weight of overburden is relatively low and attendant vertical stress is low, therefor induced fractures are likely to be horizontal, and pancakelike when unbounded in area. Subsurface battery 200 may be formed by the same methods described above with respect to subsurface battery 100 of FIG. 1 and may function in the same manner as describe above with respect to subsurface battery 100 of FIG. 1.

Figure 3:
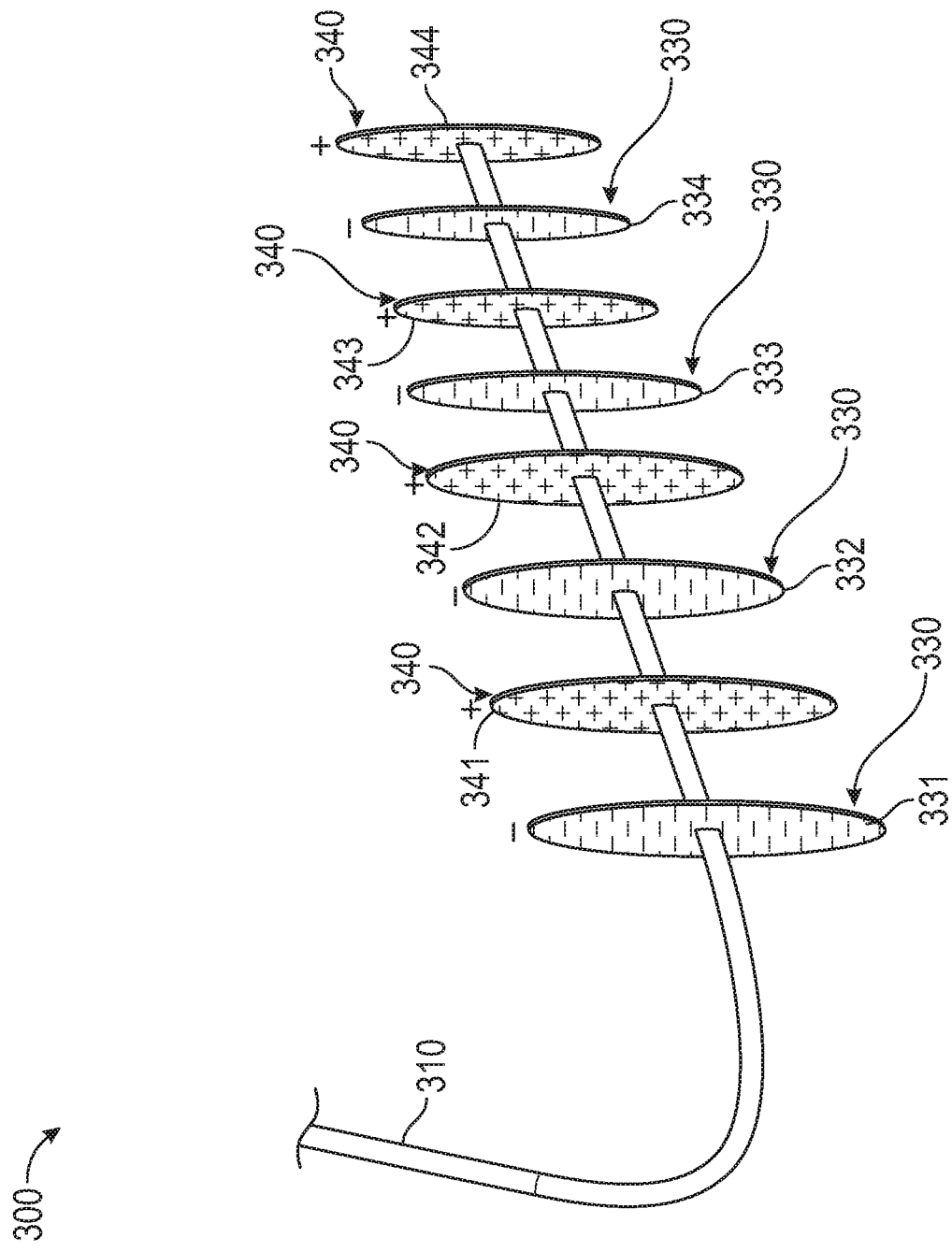
FIG. 3 is a diagram of a subsurface battery utilizing horizontal drilling techniques, according to certain embodiments.

FIG. 3 illustrates a subsurface battery 300 utilizing horizontal drilling techniques, according to certain embodiments. In the illustrated embodiment, each cathodic fracture 340 is labeled with a "plus symbol" and each anodic fracture 330 is labeled with a "minus symbol." In the illustrated embodiment, a horizontal well casing 310 may be drilled to penetrate one or more anodic fractures 330 and cathodic fractures 340. In some embodiments, the horizontal well 310 may be used to hydraulically fracture the anodic fractures 330 and cathodic fractures 340. The well casing 310 in the illustrated embodiment may not serve as an electrode; rather, it may serve as conduit for the multiple strings of conductors. Each conductor may contact one or more anodic fracture 330 or cathodic fracture 340. For example, a conductor string may be disposed within the well casing such that it contacts one or more anodic fracture 330 but is electrically isolated from the cathodic fractures 340. Likewise, conductors may be disposed such that they contact one or more cathodic fracture 340 but are electrically isolated from the anodic fractures 330.

In some embodiments, anodic and cathodic fracture pairs may be separated by a greater distance that the distance between an anodic fracture 330 and a cathodic fracture 340. For example, anodic fracture 331 and cathodic fracture 341 may be separated by a smaller distance than cathodic fracture 341 and anodic fracture 332. In particular embodiments, an anodic fracture and cathodic fracture pair may be separated from each other by less than 20 meters of strata and be separated from another fracture pair by more than 20 meters of strata.

Additionally, multiple anodic fracture and cathodic fracture pairs may be connected to each other in series or parallel to adjust properties of the battery. For example, the pair of anodic fracture 331 and cathodic fracture 341 may be connected to the pair anodic fracture 332 and cathodic fracture 342 in series to increase the voltage of the subsurface battery 300 or may be connected in parallel to increase the current and capacity of subsurface battery 300.

Figure 4:
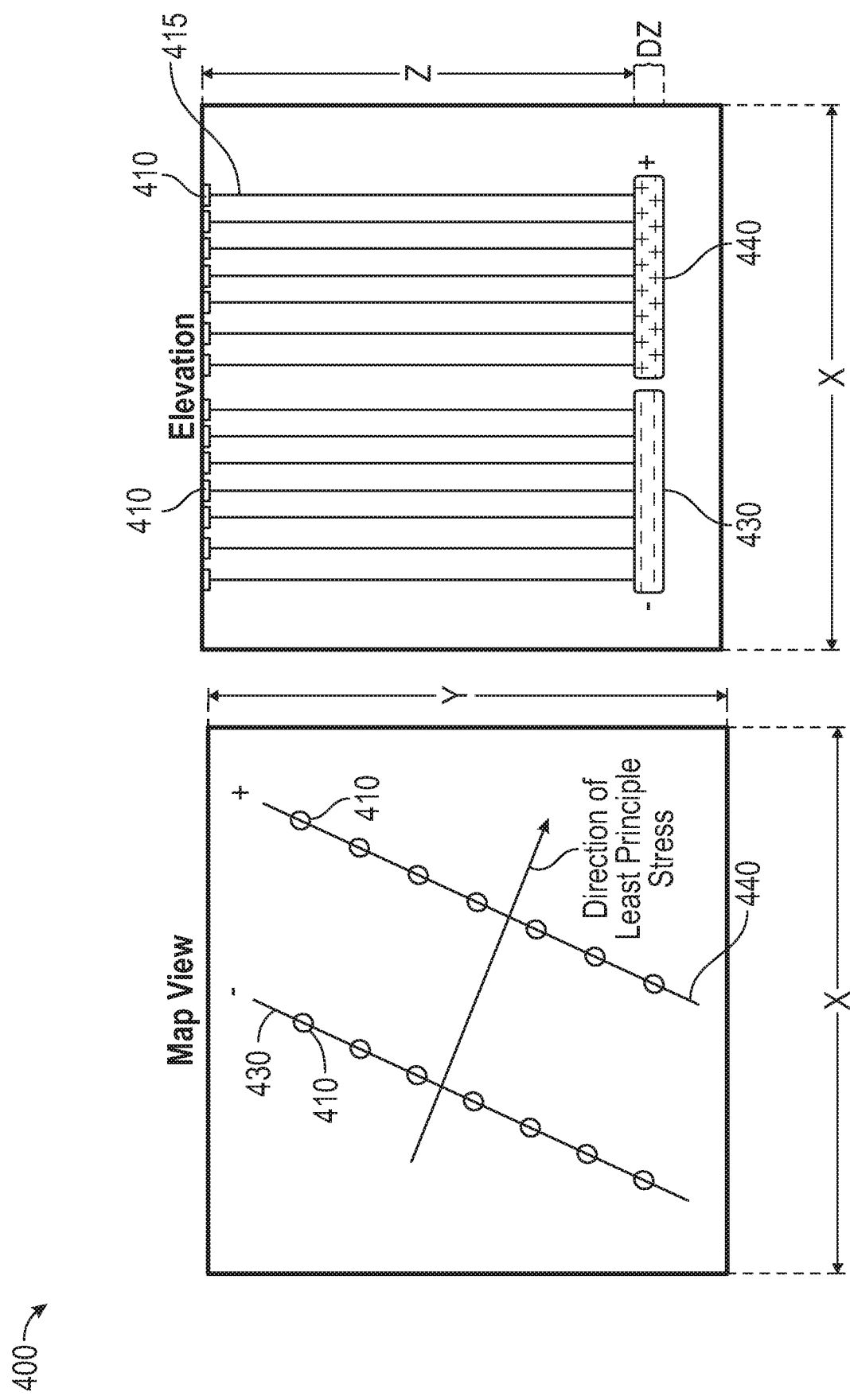
FIG. 4 illustrates, in map view and elevation view, the surface casings of well electrodes arranged to take advantage of vertical fractures from well to well for well pairs oriented along planes of maximum subsurface stress, according to certain embodiments.

FIG. 4 illustrates a subsurface battery 400 in map view and elevation view the surface casings 410 of well electrodes 415 arranged to take advantage of vertical fractures from well to well for well pairs oriented along planes of maximum subsurface stress. In the elevation view, the electrode wells 415 are shown with their interconnecting vertical fractures creating extended anode fracture plates 430 and cathode fracture plates 440 of extraordinary length. In some embodiments, the order of magnitude of distances illustrated by FIG. 4 may be 10's of meters in the X direction, kilometers along the Y direction, kilometers along the Z direction, with the Z direction representing elevation or depth below ground. In some embodiments, DZ, representing the vertical height of a cathodic or anodic fracture, may have an order of magnitude in the 10's of meters. Accordingly, the anodic fractures 430 and cathodic fractures 440 may have a length up to several kilometers and a depth of up to several hundred meters. In some embodiments, battery plates 430 and 440 may have an area of 10,000 or more square meters. In other embodiments, battery plates 430 and 440 may have an area of less than 10,000 square meters.

For example, in one embodiment, the cathodic fracture 440 and anodic fracture 430 may be separated by between 1 meter and 10 meters of subsurface stratum such as a permeable saltwater bearing formation 100. The cathodic fracture may have a length between 1 and 10 kilometers and a height between 10 and 100 meters, and the anodic fracture may have a length between 1 and 10 kilometers and a height between 10 and 100 meters.

In some embodiments, each pair of one cathodic well casing electrode and one anodic well casing electrode 410 may form anodic and cathodic terminals of a subsurface battery. The well casing electrodes may be connected, in particular embodiments, in such a way as to create the effect of a sequence of subsurface batteries arranged in either parallel or series connections.

Figure 5:
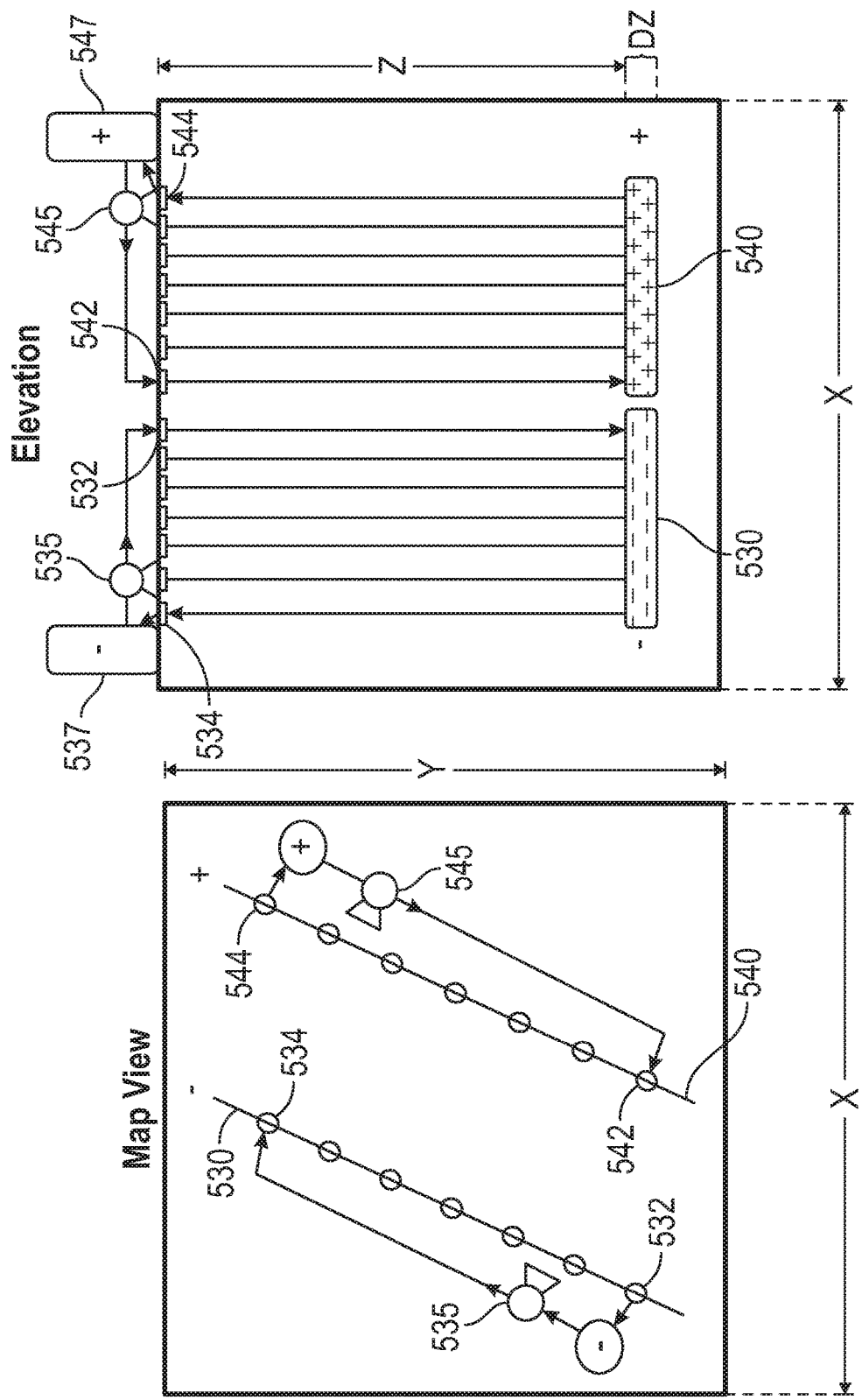
FIG. 5 is a schematic depicting the storage and pumping of anolyte (+) and catholyte (−) in a very large subsurface flow battery, according to certain embodiments.

FIG. 5 is a schematic depicting the storage and pumping of anolyte (+) and catholyte (−) in a very large subsurface flow battery 500, according to certain embodiments. In the illustrated embodiment, a catholyte may be pumped through a cathodic fracture 540 by a catholyte pump 545, and an anolyte may be pumped through an anodic fracture 530 by an anolyte pump 535. Catholytes and anolytes may be electrolyte solutions. The catholyte may be stored in catholyte storage vessel 547 and the anolyte may be stored in anolyte storage vessel 537. In some embodiments, the catholyte may be pumped into a well casing 542 located at one end of the cathodic fracture 540 an out of a well casing 544 located at the other end of the cathodic fracture 540. Likewise, the anolyte may be pumped into a well casing 532 located at one end of the anodic fracture 530 an out of a well casing 534 located at the other end of the anodic fracture 530. The catholyte may be pumped through the cathodic fracture 540 at a pressure lower than the fracturing pressure of subsurface stratum in which cathodic fracture 540 has formed to ensure the catholyte flows through the cathodic fracture without fracturing the surrounding stratum. Likewise, the anolyte may be pumped through anodic fracture 530 at a pressure lower than the fracturing pressure of the surrounding stratum. In certain embodiments, excess catholyte and anolyte may be stored in a catholyte storage vessel 545 and an anolyte storage vessel 535, respectively.

When a subsurface flow battery 500 is fully discharged, the anolyte stored in anolyte storage vessel 537 and the catholyte stored in catholyte storage vessel 547 may have the same composition. However, when subsurface flow battery 500 is fully charged the catholyte may have different ionic compositions resulting in a flow of charge when the anolyte and catholyte are circulated through the subsurface flow battery 500. For example, in a zinc-polyiodide flow battery, when fully charged the anolyte may be a solution of zinc ions ($Zn^{2+}$), iodide ions ($I^-$) and polyiodide ions ($I^{3-}$), and the catholyte may be a solution of zinc ions and iodide ions. When fully discharged, both the anolyte storage vessel 537 and catholyte storage vessel 547 may contain solutions of zinc ions ($Zn^{2+}$) and iodide ions ($I^-$). Other examples of catholyte-anolyte solution pairs for subsurface flow battery 500 include zinc-halide, lead-acid, zinc-cerium, hydrogen-bromine, and hydrogen-lithium chlorate.

Subsurface flow battery 500 may be created in a manner similar to that described with respect to subsurface battery 100 of FIG. 1 or subsurface batter 200 of FIG. 2 and may be formed in geological stratum similar to those illustrated in FIGS. 2 and 2.

In the illustrated embodiment, multiple pairs of electrode wells are connected by fractures to form flow batteries. In this embodiment, the fractures created may be of the traditional sand propped type designed to create a preferential conduit for flow of anolyte and catholyte. The less permeable matrix of the target stratum between the cathode wells and anode wells, such as the permeable saltwater bearing formation 170 illustrated in FIG. 1, may serve as an ion transport membrane.

In some embodiments, sodium-based battery chemistry may be desirable for a subsurface battery, as sodium salt is the most common dissolved compound indigenous to the subsurface. A subsurface battery is not limited to a particular chemistry, however. The subsurface electrolytes may be modified by flushing the porous strata between well pairs by pumping fluids into one well and out the other at matrix rates (flow rates below fracturing rates and pressures).

For example, to create a lead acid subsurface flow battery, a sandstone stratum with a matrix inert to sulfuric acid may be selected. Use of acids of various sorts is a common procedure for treating wells in the petroleum industry and their effects on strata of various composition are well known. To make the lead acid battery, a well electrode pair may be drilled and installed, then the wells may be fracture treated with lead compounds. Finally, an appropriate aqueous solution of sulfuric acid may be pumped down one well, then out the other, displacing the porous matrix of the sandstone stratum between the wells. In other embodiments, various other metal-acid subsurface batteries may be created by a similar method.

In other example implementations, the subsurface batteries feature dual-ion battery technology. In general, the electrodes in subsurface batteries are separated by porous and permeable, structurally competent materials that contain the electrolyte which supports ion transfer between the electrodes. This permeable membrane, depending on choice of material, may also be reinforced for structural purposes, and may be a few feet thick, far wider than traditional storage battery electrode separation distances. Applying dual ion redox battery chemistry to shorten the ion diffusion lengths in subsurface batteries may improve charge/discharge rates and power density.

Figure 6:
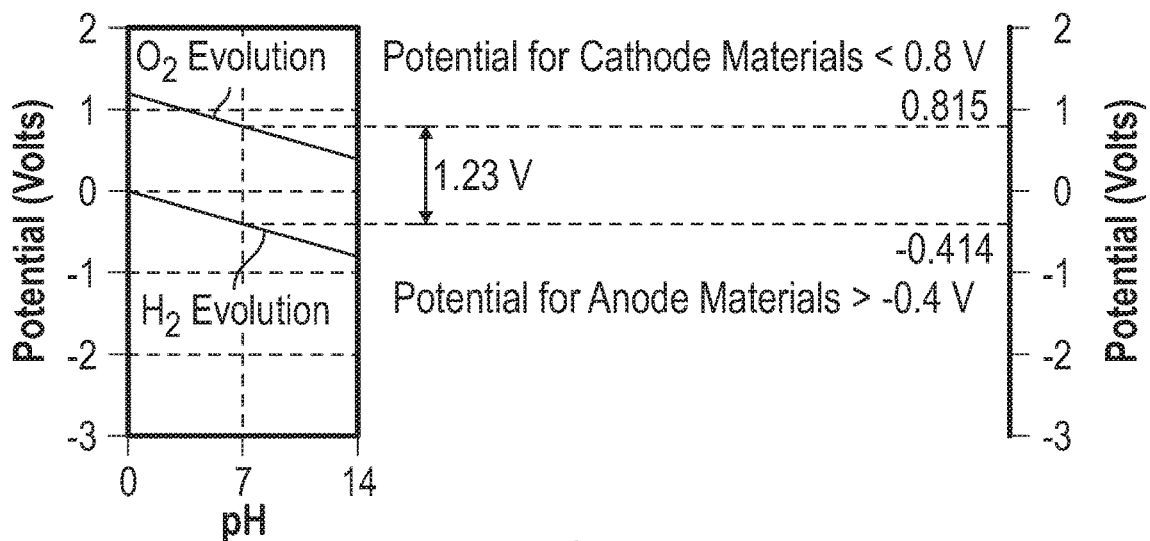
FIG. 6 is a diagram of the potential for water electrolysis in an aqueous battery and shows the stability window for aqueous battery design.

In one embodiment a subsurface battery is operated in an aqueous system in which NaCl salt in a substantially $H_2O$ solution is used as the electrolyte. As shown in FIG. 6, because water electrolysis that leads to $H_2$ and $O_2$ evolutions happens when applied potential is greater than 1.23 V, in certain example embodiments the intercalation or adsorption potentials for electrodes are designed to locate in a stability window of 1.23 V. Specifically for a NaCl electrolyte whose pH value is 7, the potential for cathode materials should be less than 0.8 V vs SHE, while that for anode materials should be larger than −0.4 V vs SHE. ("SHE" stands for "Standard Hydrogen Electrode")

Figure 7:
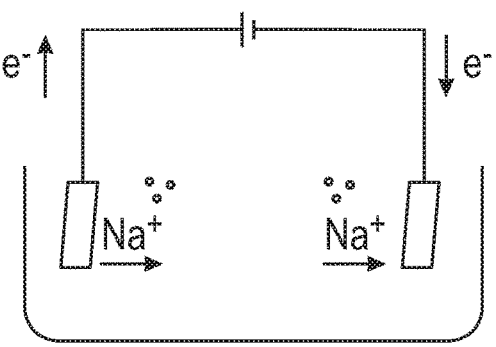
FIG. 7 is a diagram of a battery with NaCl electrolyte.

As shown in FIG. 7, a "rocking chair" aqueous rechargeable battery design, the cathode provides a sodium source and Na+ acts as charge carriers through reversible intercalations between cathode and anode. NaCl electrolyte serves as Na+ ion conducting, as well as an electron insulating medium. In certain example embodiments, the cathode should provide Na intercalation potential below 0.8 V vs SHE, and the anode potential is over −0.4 V vs SHE. Consequently, promising candidates for cathode are Mn-based oxides/phosphates/silicates, V-based phosphates/silicates, metal hexacyanoferrates (for example, CuHCF, NiHCF, MnHCF, etc.), activated carbon, etc., and candidates for the anode include metal or sodiated metal oxides/sulfides (for example, $V_2O_5$, $Fe_2O_3$, $MnO_3$, $NaV_3O_8$, $TiO_2$, $TiS_2$, etc.), metal phosphates (for example, $FePO_4$, $MnPO_4$, $NaTi_2(PO_4)_3$, etc.), activated carbon, etc.

Figure 8:
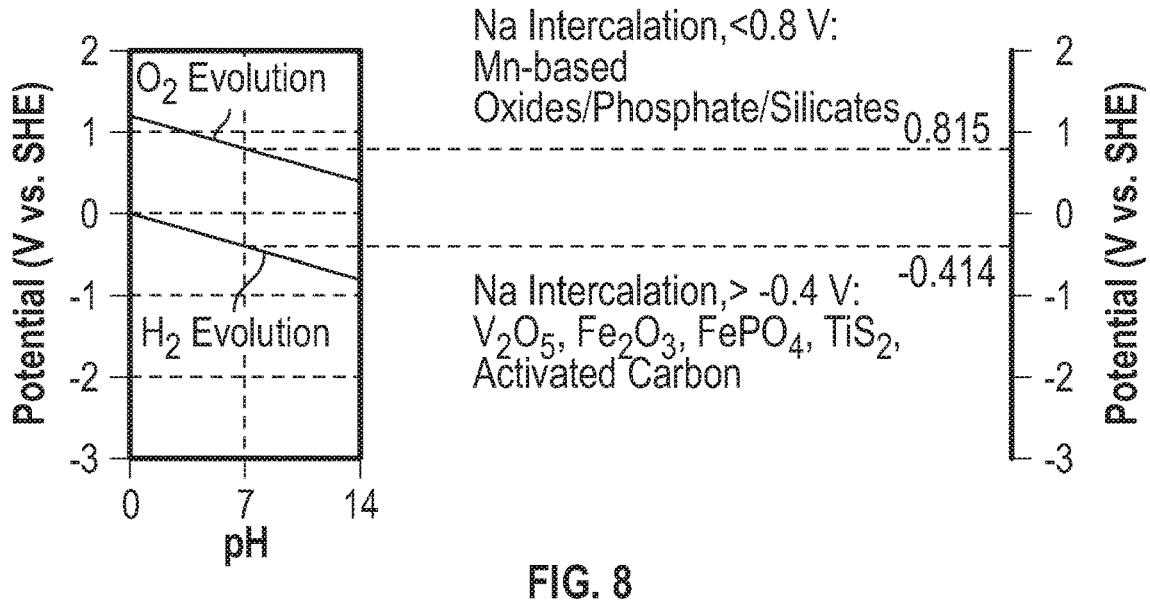
FIG. 8 is an illustration of design principle for aqueous NaCl solution based on a "rocking chair" battery design.

As shown in FIG. 8, in dual ion subsurface batteries, both Na and Cl ions are charge carriers, and they are supplied by the electrolyte which now serves as an electrochemically active medium. The electrodes now act as acceptors of Na or Cl ions that trigger the relative redox reaction. Electrodes can also be designed to contain Na and Cl ions that function together with electrolyte as charge carrier suppliers.

Figure 9:
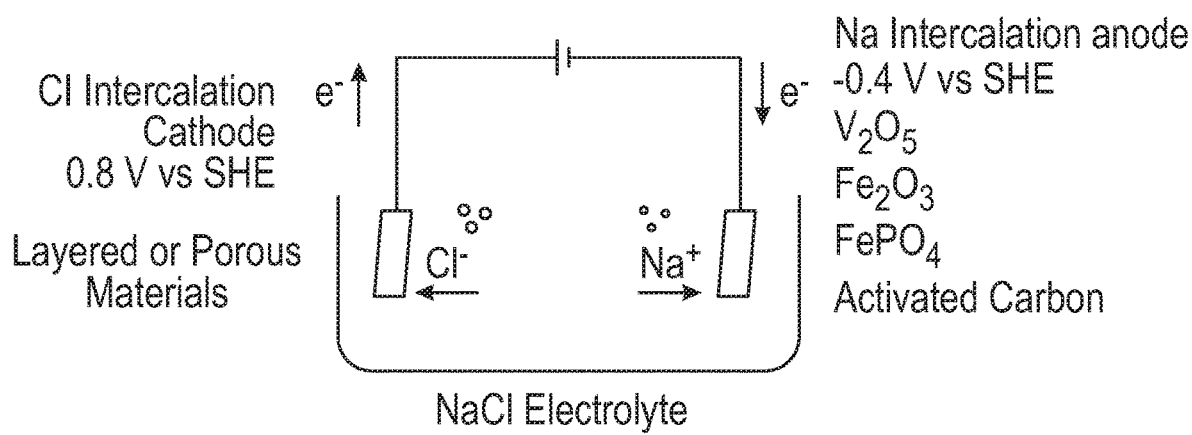
FIG. 9 is a diagram of a dual-ion battery where the electrode materials do not supply Na and Cl.

As shown in FIG. 9, in embodiments where there are no Na and Cl sources in the electrodes, the electrodes are carrier acceptors. In the dual ion system, Cl− donates an electron to an external circuit as cathode. The potential for Cl intercalation should be below 0.8 V vs SHE. The candidate materials may be graphite, oxides, nitrides, phosphates, carbides, etc., that have layered or porous structures with large space that permits reversible Cl diffusion. And Cl-based metal oxychloride (for example, BiOCl, FeOCl, MnOCl, etc.), layered or porous compounds such as Double-Layered Hydroxides, clay and activated carbon. The potential for Na intercalation should be higher than −0.4 V vs SHE. Candidates may be metal or sodiated metal oxides/sulfides (for example, $V_2O_5$, $Fe_2O_3$, $NaV_3O_8$, $TiO_2$, $TiS_2$, etc.), metal phosphates (for example, $FePO_4$, $MnPO_4$, $NaTi_2(PO_4)_3$, etc.), activated carbon, etc.

Figure 10:
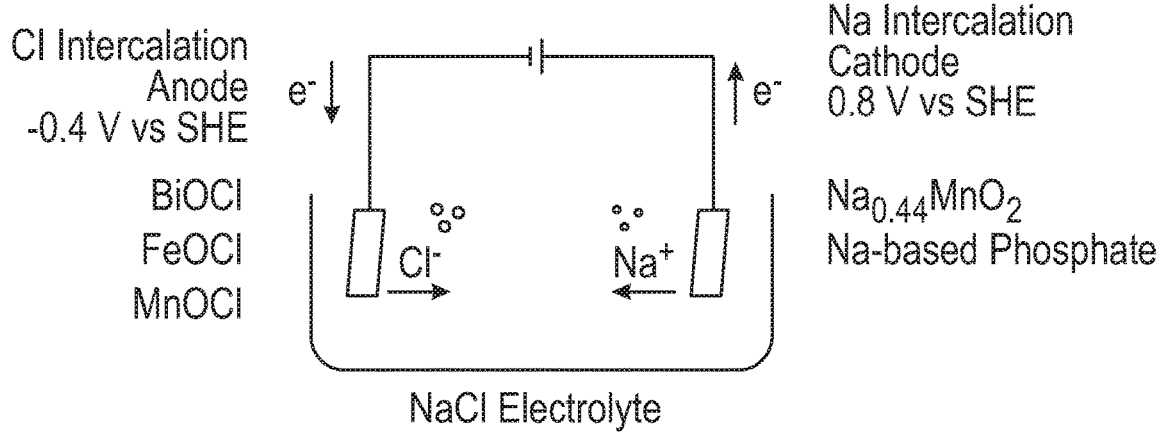
FIG. 10 is a diagram of a dual-ion battery where the electrode materials also supply Na and Cl sources.

As shown in FIG. 10, in embodiments where the electrode materials also supply Na and Cl sources, the design principle is reversed, so that when charging the battery, Cl will supply an electron and diffuse into the electrolyte, while at the same time Na donates an electron to an external circuit. In this case, Na-based compounds now work as cathode with potential lower than 0.8 V vs SHE. And the candidates may be Mn-based oxides/phosphates/silicates, V-based phosphates/silicates, metal hexacyanoferrates (for example, CuHCF, NiHCF, MnHCF, etc.), activated carbon, etc., Graphite, oxides, nitrides, phosphates, carbides, etc., that have layered or porous structures with large space that permits reversible Cl diffusion. Cl-based metal oxychloride (for example, BiOCl, FeOCl, MnOCl, etc.), layered or porous compounds such as Double-Layered Hydroxides, clay and activated carbon are candidates for the anode with potential higher than −0.4 V vs SHE.

In certain embodiments, the dual ion battery design provides advantages over the traditional rocking chair design for subsurface batteries. First, because the electrolyte is an electrochemically active medium, Na+ and Cl− ions diffuse into neighboring electrodes simultaneously without the long travel of a single charge Na+ ion carrier. This can improve the rate performance of large scale subsurface batteries. Second, this system provides a pathway to way to using electrode materials that do not require a pre-sodiation treatment, resulting in reduced materials cost.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for forming a subsurface battery comprising:
   drilling a first well into a subsurface stratum;
   drilling a second well into a subsurface stratum;
   hydraulically fracturing the subsurface stratum from the first well to form a first fracture;
   hydraulically fracturing the subsurface stratum from the second well to form a second fracture;
   treating the first fracture with an anodic material, wherein the anodic material includes $TiS_2$;
   treating the second fracture with a cathodic material, wherein the cathodic material includes a Mn-based silicate;
   cementing the first well above an impermeable formation in the subsurface stratum into which the first well is drilled;
   cementing the second well above an impermeable formation in the subsurface stratum into which the second well is drilled; and
   pumping an electrolyte through the first well into the subsurface stratum into which the first well is drilled, at a pressure below a fracturing pressure of the subsurface stratum into which the first well is drilled, or pumping an electrolyte through the second well into the subsurface stratum into which the second well is drilled, at a pressure below a fracturing pressure of the subsurface stratum into which the second well is drilled, wherein the electrolyte includes NaCl salt in a substantially $H_2O$ solution.

* * * * *